United States Patent Office 3,208,720
Patented Sept. 28, 1965

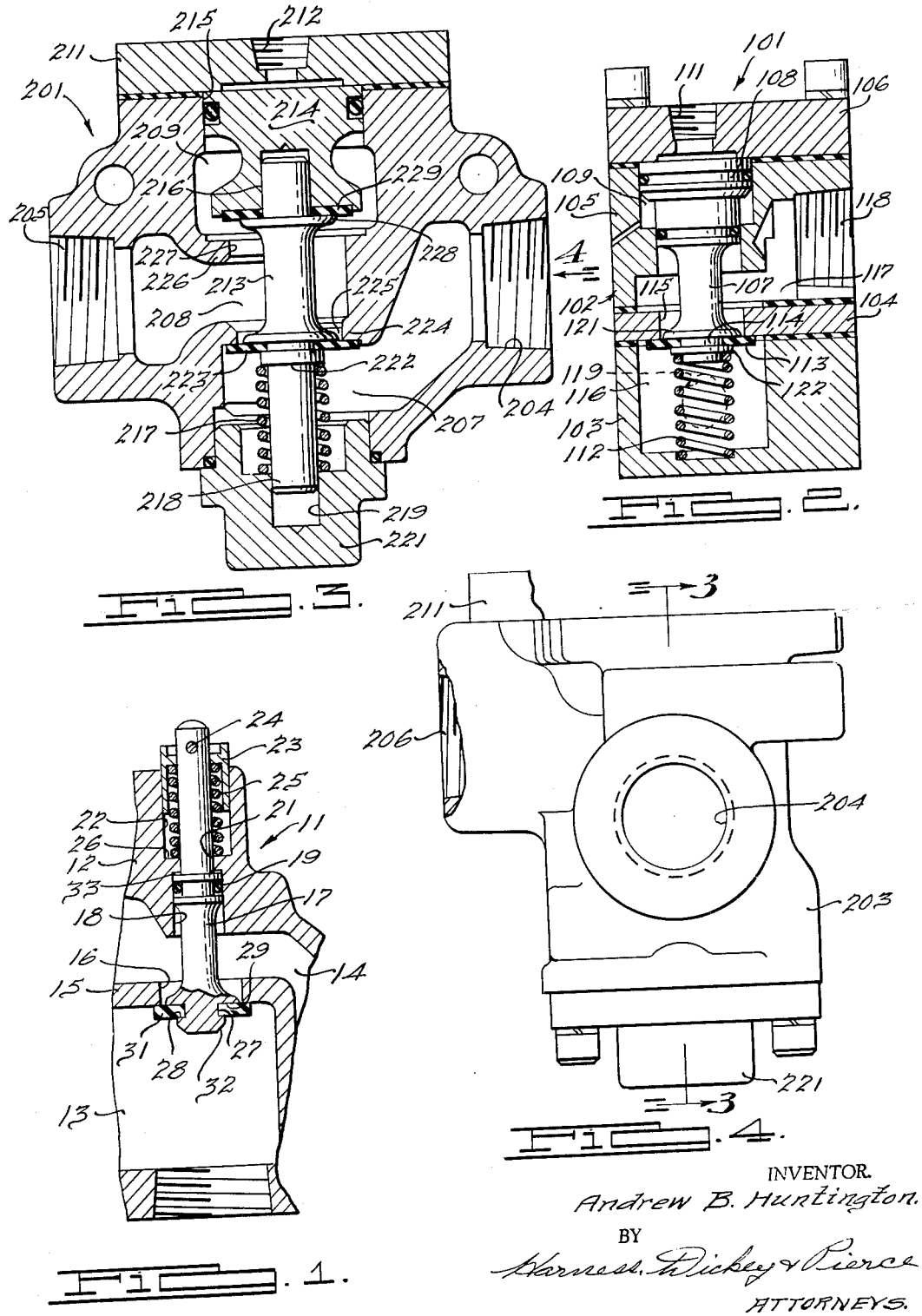

3,208,720
RECIPROCATING VALVE
Andrew B. Huntington, Royal Oak, Mich., assignor to Ross Operating Valve Company, Detroit, Mich., a corporation of Michigan
Filed May 24, 1962, Ser. No. 197,404
1 Claim. (Cl. 251—322)

This invention relates to valves, and more particularly to valve sealing members for use with axially reciprocating valve stems.

It is an object of the present invention to provide a novel and improved valve sealing member which incorporates advantages of poppet-type valves but which permits the use of higher inlet pressures and makes possible both a faster valve response time and reduced pressure drop across the valve seat due to fluid flow.

It is another object to provide a valve seal construction of this type which greatly decreases the cost of fabrication and maintenance of a valve assembly incorporating the seal construction.

Other objects, features, and advantages of the present invention will become apparent from the subsequent description, taken in conjunction with the accompanying drawings, in which:

FIGURE 1 is a fragmentary cross-sectional view in elevation of a manually operated two-way valve incorporating the novel valve seal construction;

FIGURE 2 is a cross-sectional view in elevation of another embodiment of the invention, showing the seal incorporated in a two-way valve of the piston-operated type;

FIGURE 3 is a cross-sectional view in elevation of still another embodiment of the invention taken along the line 3—3 of FIGURE 4 and showing the seal incorporated in a three-way valve unit; and FIGURE 4 is an end elevational view of the valve unit shown in FIGURE 3, taken in the direction of the arrow 4 of FIGURE 3.

In general terms, the invention comprises an axially slidable valve stem extending through a circular port formed in a wall separating two valve chambers, a portion of one side of this wall forming a valve seat which surrounds the port on the side subjected to higher pressure when the valve is closed. The valve seal comprises an annular washer-like member of flexible and resilient material, this member being so dimensioned as to have substantial flexibility in the general direction of its central axis and being engageable with the valve seat. The sealing member is mounted on the stem by means of an annular groove formed in the stem, and the low pressure side of the stem has an annular shoulder in supporting engagement with the seal. The stem shoulder which engages the seal surface exposed to higher pressure may be relatively narrow, thus permitting the seal to be easily mounted or detached.

Referring more particularly to the drawings, FIGURE 1 illustrates a valve assembly generally indicated at 11 and having a housing 12 within which is formed an inlet chamber 13 and an outlet chamber 14. A wall 15 separates these chambers, the wall having a circular valve port 16. A stem 17 is slidably mounted in a bore 18 formed in housing 12. An annular seal 19 is carried by stem 17 and is engageable with bore 18 to prevent leakage from chamber 14. Stem 17 extends through a narrower bore 21 into a wider bore 22 at the top of the housing. An annular guide member 23 is slidably mounted on stem 17 and slides within bore 22. A pin 24 extending through the upper end of stem 17 limits upward movement of guide 23, and a helical compression spring 25 is disposed between guide 23 and the shoulder 26 between bores 21 and 22, thus urging stem 17 upwardly. The outer end of the stem is exposed for manual or other actuation.

An annular groove 27 is formed at the lower end of stem 17 slightly below port 16. Groove 27 has a lower shoulder 28 of relatively narrow proportions and an upper shoulder 29 which is somewhat wider and slightly less in diameter than port 16. A valve seal 31 is mounted in groove 27. Seal 31 comprises an annular washer-like member of flexible and resilient material such as neoprene rubber. Member 31 is shown as having flat parallel end surfaces, but it will be understood that the shapes of these surfaces could be varied within the principles of the invention. The inner diameter of member 31 is approximately the same as the diameter of groove 27, and the outer diameter is somewhat greater than the diameter of port 16. The thickness of member 31 is about the same as the width of groove 27, so that shoulders 28 and 29 will engage the flat ends of member 31 when it is slipped onto stem 17. The lower end 32 of the stem may be tapered to facilitate assembly of member 31.

In operation, valve assembly 11 will normally be held in a closed position as seen in FIGURE 1 by spring 25 and the pressure differential between inlet chamber 13 and outlet chamber 14. When in its closed position, seal 31 will engage the underside of wall 15 immediately surrounding port 16, and the pressure differential between chambers 13 and 14 will increase the sealing effect of member 31 against wall 15 and shoulder 29. A slight clearance 33 may exist between stem 17 and the lower end of bore 21 when seal 31 is fully seated, but this clearance will be insufficient to permit such upward movement of stem 17 as would unseat member 31. The presence or amount of this clearance will not be otherwise critical due to the flexibility of member 31 when creating the sealing effect.

Should it be desired to move the valve to open position, stem 17 may be depressed. Because of the relatively light total weight of the valve components, movement may be accomplished relatively quickly with a minimum amount of exerted effort. The pressure drop due to fluid flow past member 31 and through port 16 will be less than with previously known types of poppet valves due to the fact that there is a minumum of valve structure in obstructing relation with fluid flow. Because of this, the buildup of pressure in outlet port 14 can be relatively rapid.

Because of the novel construction, there will be no danger of member 31 becoming dislodged from its position on stem 17, thus eliminating a problem which exists with some types of conventional poppet valves having an annular resilient ring mounted in a groove on a radial shoulder of the valve stem overlapping the port. The maximum usable pressure in an assembly 11 of a given capacity will therefore be increased as compared with previously known poppet valves.

FIGURE 2 illustrates another embodiment of the invention which differs from that previously described in that the valve stem is piston-operated. The assembly is generally indicated at 101 and comprises a housing generally indicated at 102 having a base 103, a port member 104, a cylinder section 105 and a cover 106. A stem 107 is provided, a piston 108 being formed at the upper end of the stem and slidable within a cylinder chamber 109. This chamber is connected to a pilot port 111 so that pressurization of chamber 109 above piston 108 will cause downward movement of stem 107. The stem is urged to its upward position by a spring 112 within base 103.

The lower end of stem 107 carries a seal member 113, this member being similar in construction to member 31 of the previous embodiment and secured to stem 107 by an annular groove 114. A circular port 115 is formed in housing member 104, and connects a chamber 116 in base 103 with a chamber 117 in housing member 105, chamber 117 leading to a port 118 while chamber 116 is connected to a port 119. As in the previous embodiment, the arrangement is such that port 119 will be connected to a source of higher pressure than port 118, so that flow through port 115 will be upward in FIGURE 2.

Seal member 113 is engageable with the underside of housing member 104 immediately surrounding port 115 when the valve is in its closed position. The upper shoulder 121 of groove 114 is of sufficiently large diameter to adequately support sealing member 113. The lower shoulder 122 of groove 114 is somewhat narrower than shoulder 121. With member 113 in its closed position, any clearance between the upper end of stem 107 and cover 106 will be insufficient to permit such upward movement of the valve stem as would allow member 113 to lose its sealing engagement with housing member 104.

In operation of the embodiment of FIGURE 2, the valve will normally be in its closed position as shown in this figure due to the urging of spring 112 and the pressure against the underside of sealing member 113. Pressurization of chamber 109 through port 111 will cause downward shifting movement of stem 107 moving sealing member 113 away from port 115. The operational advantages of the valve described with respect to FIGURE 1 will also be present in the embodiment of FIGURE 2.

FIGURES 3 and 4 illustrate still another embodiment of the invention in which the sealing member forms part of a three-way valve assembly, generally indicated at 201. The assembly has a housing 203 with an inlet port 204, a working port 205 and an exhaust port seen partially at 206 in FIGURE 4. Inlet port 204 is connected to a chamber 207 in the lower portion of housing 203, while working port 205 is connnected to a central chamber 208 within the housing. Exhaust port 206 is connected to a chamber 209 in the upper portion of housing 203, and a cover 211 is provided with a pilot port 212 as in the embodiment of FIGURE 2.

Valve stem 213 carries a piston 214 at its upper end, the piston being disposed within a cylinder chamber 215 formed in the upper end of housing 203 and connected with port 212. A slip fit indicated at 216 is provided between stem 213 and 214, although these two members may be rigidly secured together if desired.

A spring 217 surrounds the lower end 218 of stem 213, this lower end being slidably disposed within a bore 219 in a lower extension 221 of housing 203. The upper end of spring 217 engages a shoulder 222 on stem 213, the upper end of this shoulder being engageable with a sealing member 223 which forms the inlet valve. This sealing member engages the underside of a wall 224 immediately surrounding a port 225 in the wall, port 225 connecting chambers 207 and 208. Sealing member 223 and the adjacent valve stem shoulders are constructed in the same manner as in the preceding embodiments.

Another wall 226 is provided between chambers 208 and 209, and an exhaust port 227 is formed in this wall. A shoulder 228 is formed on stem 213 immediately below slip fit 216, and an exhaust sealing member 229 is disposed between this shoulder and the underside of piston 214, this underside being shown as slightly recessed to receive member 229. Members 223 and 229 may be similarly formed, although it will be noted that member 229 is supported differently than is member 223 in that it is of lesser diameter than the portion of piston 214 which engages it. Shoulder 228 is, of course, of sufficiently small diameter to permit the underside of member 229 to engage the upper surface of wall 226 surrounding port 227.

In operation of the embodiments of FIGURES 3 and 4, the assembly will normally be held in its exhaust position as shown in FIGURE 3 by spring 217. In this position, sealing member 223 will close port 225 while sealing member 229 will be withdrawn from port 227, connecting working port 205 to exhaust port 206. Any clearance to be taken up between the upper end of piston 214 and cover 211 will be insufficient to permit seal 223 to become disengaged from its seat. Upon pressurization of port 212, piston 214 will be forced downwardly, closing port 227 by engagement of seal 229 with wall 226. At the same time, seal 223 will be withdrawn from port 225, connecting inlet port 204 to working port 205. Relief of pressure at port 212 will cause the valve to return to its exhaust position. Because of slip fit 216, sealing member 229 will perform a cushioning function between stem 213 and piston 214 if piston 214 strikes cover 211 upon upward movement.

As compared with previously known types of poppet valves, the present invention affords a substantial saving in fabrication and maintenance costs. The requirement for inserting or molding annular sealing rings in grooves formed in valve stem shoulders, necessary in previous types of poppet valve constructions, is eliminated by the present invention. Sealing member 31, 113 or 223 may be merely slipped onto its valve stem and, by slight distortion, snapped into position in the retaining groove. No additional members or carriers to be fastened or otherwise mounted onto the stem are needed; such members have been widely used to secure washer types of poppet valve seals to valve stems.

Machining costs are further reduced by the fact that no critical clearances are required between the valve stem and its abutment when in the closed position. With former types of poppet valves which relied upon the compressive force between an annular ring and the valve seat to accomplish the sealing action, slight clearance had to be provided between the valve stem and its abutment to insure that such compressive action took place. With the present invention, there is a wide latitude permitted due to the flexibility of seal members 31, 113 and 223 which permits them to engage their respective seats with a sealing action despite variations in the final position of the piston. As described previously, the valve stem should not be allowed so much travel that the seal member would be pulled away from its seat and drawn partially into the valve port, since this would destroy the sealing effect. There must of course be sufficient valve stem travel to permit the seal member to come into sealing engagement with the valve seat.

The maintenance problem is greatly eased according to the present invention by virtue of the fact that the seal members may be reversed when worn on one side, and may be easily replaced.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

In combination, a valve housing having first and second chambers adapted to be connected in a fluid system so that said first chamber will normally be at higher pressure than said second chamber, a circular port of constant diameter between said chambers and having a flat side facing said first chamber, a valve stem slidably mounted in said housing, resilient means urging said valve stem in a valve closing direction, means for moving the valve stem axially in a valve opening direction against the urging of said resilient means, a portion of said valve stem disposed adjacent said port, said valve stem portion having an annular groove, a sealing member of generally flat washer-like shape fabricated of a resilient flexible rubber-like material mounted in said groove, said sealing member being so dimensioned as to have substantial flexibility in the general direction of its central axis, the outer diameter of said sealing member being greater than the diameter of said port, said sealing member being engageable with the flat side of said port facing said first chamber when said valve stem is moved to its valve closing position, the portion of said valve stem on the side of said sealing member toward said first chamber comprising a shoulder of substantially smaller diameter than said sealing member outer diameter and said port, and another shoulder on the other side of said groove slightly less in diameter than said port and of sufficiently large diameter to adequately support said sealing member, and means comprising opposing shoulders separate from said moving means fixed to said valve stem and housing respectively and spaced a substantial axial distance from said port for preventing movement of said valve stem past said valve closing position sufficiently to separate said sealing member from sealing engagement with said port.

References Cited by the Examiner
UNITED STATES PATENTS

| | | | |
|---|---|---|---|
| 1,246,787 | 11/17 | Rosner | 251—318 XR |
| 1,302,538 | 5/19 | Gulick | 137—413 |
| 2,154,255 | 4/39 | Williams | 251—323 XR |
| 2,764,324 | 9/56 | Landreth | 251—322 XR |
| 2,825,363 | 3/58 | Bird | 137—627.5 |

FOREIGN PATENTS 609,042  9/48  Great Britain.

References Cited by the Applicant
UNITED STATES PATENTS

| | | |
|---|---|---|
| 2,307,546 | 1/43 | Himer. |
| 2,872,221 | 2/59 | Burns et al. |
| 2,893,685 | 7/59 | Van Camp. |
| 2,911,995 | 10/59 | Preising. |

FOREIGN PATENTS

| | | |
|---|---|---|
| 1,183,324 | 9/57 | France. |
| 888,790 | 9/53 | Germany. |

M. CARY NELSON, *Primary Examiner.*

ISADOR WEIL, *Examiner.*